United States Patent
Boone et al.

(10) Patent No.: US 6,311,240 B1
(45) Date of Patent: Oct. 30, 2001

(54) HARDWARE ASSISTED FORMATTED DATA TRANSFER SYSTEM HAVING A SOURCE STORAGE CONTROLLER AND A FORMATTING STORAGE CONTROLLER RECEIVING ON-MEDIA STRUCTURE DEFINITION AND A DATA DEFINITION

(75) Inventors: Steven E. Boone, Monument, CO (US); Steven J. Peters, Shrewsbury, MA (US)

(73) Assignee: Compaq Computer Corporation, Houston, CO (US)

( * ) Notice: Subject to any disclaimer, the term of this patent is extended or adjusted under 35 U.S.C. 154(b) by 0 days.

(21) Appl. No.: 09/213,760

(22) Filed: Dec. 17, 1998

(51) Int. Cl.$^7$ .............................. G11B 3/64; G06F 13/38
(52) U.S. Cl. .............................. 710/74; 710/72; 369/84; 369/85
(58) Field of Search .................... 369/84, 85; 71/74, 71/72

(56) References Cited

U.S. PATENT DOCUMENTS

| | | | |
|---|---|---|---|
| 4,494,156 * | 1/1985 | Kadison et al. | 360/48 |
| 4,707,750 * | 11/1987 | Anderson et al. | 360/60 |
| 5,592,640 * | 1/1997 | Minoura et al. | 711/101 |
| 5,953,513 * | 9/1999 | Saiki et al. | 395/500.44 |
| 6,064,635 * | 5/2000 | Machiguchi | 369/34 |

FOREIGN PATENT DOCUMENTS 3-257521 * 11/1991 (JP) .

* cited by examiner

Primary Examiner—Thomas Lee
Assistant Examiner—Ilwoo Park
(74) Attorney, Agent, or Firm—William J. Kubida; Kent A. Lembke; Hogan & Hartson LLP

(57) ABSTRACT

A system and method for hardware assisted formatted data transfer allows a formatting storage controller to read and record data on a formatted storage medium and avoids a requirement of continuous interaction by a host system in the transfer process. The host system can initiate the transfer process by sending a command block, a data definition, and an on-media structure definition to a formatting storage controller, which performs the formatted transfer and notifies the host system when the transfer is completed or an exception occurs. Alternately, the formatting storage controller can access one or more on-media structure definitions stored in a persistent storage unit in accordance with an on-media structure selector provided by the host system in the command block. In alternative implementations, the system and method of the present invention allows for the performance of a "verify copy" operation which causes the formatting storage controller to compare the formatted data recorded on the formatted storage medium with the data stored on an alternate storage medium (e.g. a source or destination storage medium) and a "formatted read" operation, which causes the formatting storage controller to read the formatted data stored on the formatted storage medium and transfer it to a destination storage medium. Further disclosed is a program product for recording data on a formatted storage medium in accordance with an on-media structure definition initiates a transfer process in accordance with a command block provided to a formatting storage controller.

38 Claims, 7 Drawing Sheets

HARDWARE ASSISTED FORMATTED DATA TRANSFER SYSTEM HAVING A SOURCE STORAGE CONTROLLER AND A FORMATTING STORAGE CONTROLLER RECEIVING ON-MEDIA STRUCTURE DEFINITION AND A DATA DEFINITION

BACKGROUND OF THE INVENTION

1. Field of the Invention

The present invention pertains generally to dynamic magnetic information storage or retrieval and more particularly to systems and methods used in controlling the electronic circuitry through which the information signal is processed.

2. Description of Related Art

Modern computers perform a variety of tasks. Obviously, for example, computers perform computations. Most recently, computers have also gained popularity as communication devices, providing E-mail and internet access capabilities. No less important, however, is a computer's capability of storing and managing large amounts of data, such as on a magnetic disk, a CD ROM, or a magnetic tape.

Mass data storage is a crucial aspect of modern computer usage. For example, a bank typically stores large volumes of data, including customer records, financial market data, and internal business records, in large interconnected computer systems. Current data is generally stored in primary storage media, such as memory arrays, magnetic hard disks or optical disks, for rapid access. In many organizations, however, this data is regularly archived (or "backed-up") on archive media, such as alternate magnetic or optical disks or for larger volumes on magnetic tape, to preserve the data for future access. Preferably, the current data is copied from the primary storage media in the computer system to the archive media. The archive media is then stored in a safe location, preferably off-site, to protect the archived data from destruction. In this manner, the existence of the current data on both the primary storage media and the archive media minimizes the risk of losing the data. For example, a fire at the bank could destroy the copy of the data in the primary storage media, but the archived data copy would still be intact. The bank could then load the archived data into the computer system to recover most of the necessary data. In the recovery process, data recorded on the tape is typically read from the tape and re-recorded on a primary storage medium.

Data recorded onto a magnetic tape is typically organized into a specific tape format. Tape formats can vary according to tape types (e.g., ½ inch, ¼ inch, and 8 mm magnetic tape). For example, on a ½ inch reel tape, data bytes are typically recorded in parallel data records onto the nine track tape. The number of bytes in a physical data record vary between one and 65,535 bytes. The available tape formats for ½ inch reel tapes generally include 800 BPI (Bytes Per Inch), 1,600 BPI, and 6,250 BPI. Actual storage capacity is a function of the recording format and the length of the tape reel. In contrast, on a ½ inch cartridge tape, data is recorded serially onto the ½ inch cartridge tape. The data records are recorded on cartridge tape tracks in a serpentine manner. As one track is completed, the recording drive switches to the next track and begins writing in the opposite direction, eliminating the wasted motion of rewinding. The number of bytes per data record is determined by the physical data record size specified by the recording device. Accordingly, the tape format in which data is to be recorded onto or read from the tape can affect, among other characteristics, storage capacity, transfer rate, data organization, and the mechanical movement of the tape during recording.

As the amount of data residing in the computer system increases, however, the time and computer resources required to archive the data also increase. In many circumstances, for example, back-up procedures are performed after normal work hours to minimize the impact on the performance of the computer system during the normal business day. In a typical configuration, data stored on one or more magnetic hard disks is read into a host computer system and organized (i.e., formatted) to be compatible with a particular tape data format. The host system then records the formatted data onto the magnetic tape. This continuous involvement of the host system in the back-up process consumes substantial host system computing cycles and decreases the host system's performance in other processes. Furthermore, to process the data at rates sufficient to keep up with the streaming speed of the tape, the involvement of the host system, including communication to and from the host system, becomes a bottleneck. Consequently, need exists for a system and method to minimize the host system involvement in the tape backup and recovery processes, particularly during the transfer of the data to and from the source storage medium to the tape.

SUMMARY OF THE INVENTION

System and method embodiments of the invention for hardware assisted formatted data transfer allow a formatting storage controller to transfer data to and from a source storage medium to a formatted storage medium and avoids a requirement of continuous interaction by a host system in the transfer process. It is an advantage of an embodiment of the present invention, therefore, that the host system is substantially free to perform other tasks during the transfer process. Furthermore, on-media structure definitions may be stored in a persistent storage unit and referenced in a command from a host system, thereby relieving the host system from storing or manipulating the details of assorted on-media storage structures.

Additional advantages and novel features of embodiments of the invention are set forth in the description which follows and will become more apparent to those skilled in the art when taken in conjunction with the accompanying drawings. The advantages of embodiments of the invention may be realized and attained by means of the instrumentalities and accommodations particularly pointed out in the appended claims.

To achieve the foregoing, as embodied and broadly described herein, a system embodiment of the present invention for recording data on a formatted storage medium comprises a formatting storage controller coupled to a formatted storage medium and a source storage medium, a data definition received by the formatting storage controller and identifying the data in the source storage medium to be read by the formatting storage controller; and an on-media structure definition received by the formatting storage controller and defining a format in which the data is to be recorded to the formatted storage medium.

An embodiment of the present invention may also comprise a method for recording data on a formatted storage medium comprising the operations of receiving an on-media structure definition in a formatting storage controller; receiving a data definition in the formatting storage controller; reading the data from a source storage medium to the formatting storage controller in accordance with the received data definition; and recording the data on the formatted storage medium in accordance with the received on-media structure definition.

DETAILED DESCRIPTION OF A PREFERRED EMBODIMENT

Figure 1:
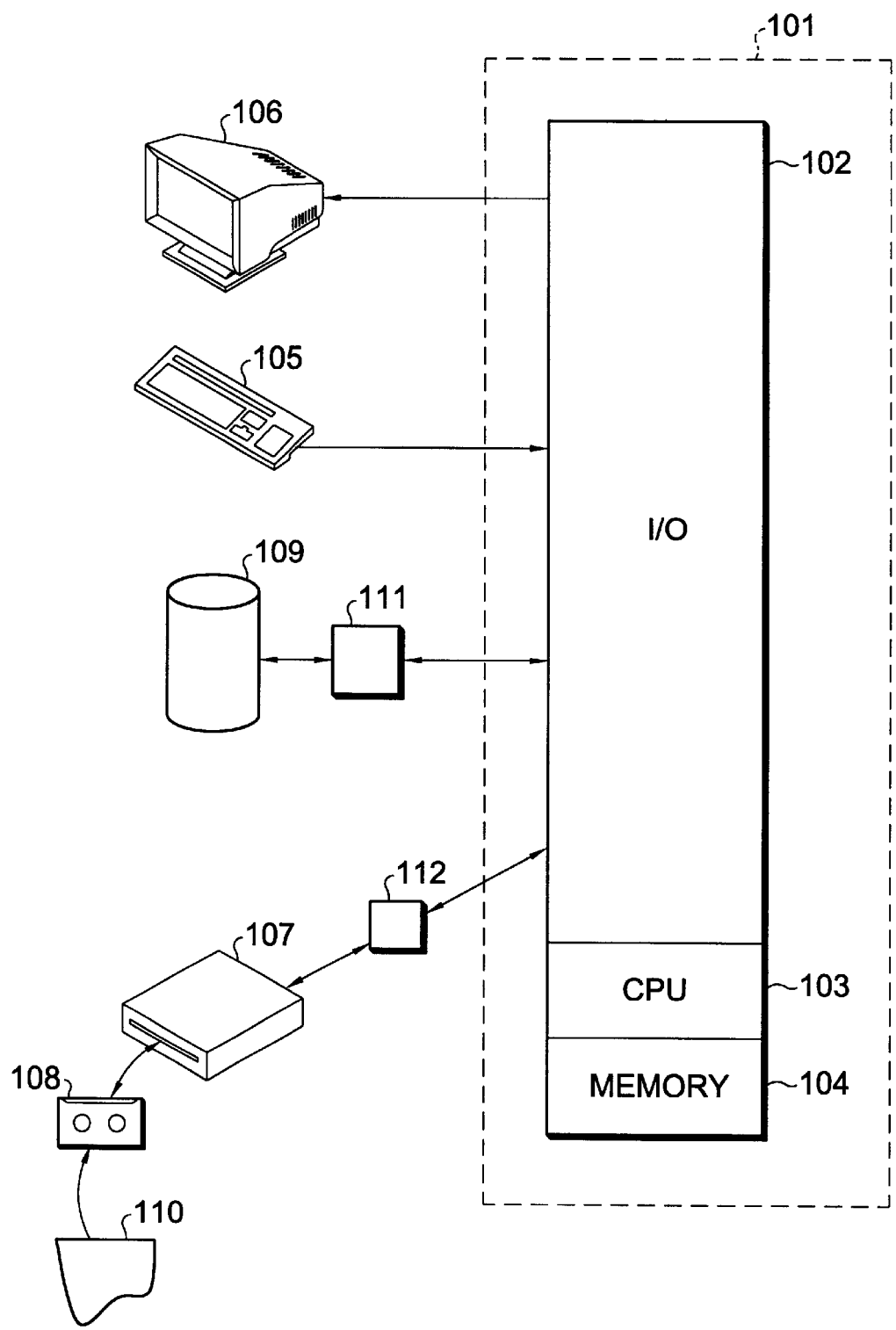
FIG. 1 depicts a general purpose computer in accordance with the present invention.

One operating environment in which the present invention is potentially useful encompasses the general purpose computer. In such a system, data and program files may be input to the computer, which reads the files and executes the programs therein. Some of the elements of a general purpose computer are shown in FIG. 1, wherein a processor 101 is shown having an input/output (I/O) section 102, a Central Processing Unit (CPU) 103, and a memory section 104. The present invention is optionally implemented in software devices loaded in memory 104 and/or stored on a configured tape 108, storage unit 109 or other storage device thereby transforming the computer system in FIG. 1 to a special purpose machine for implementing the present invention.

The I/O section 102 is connected to keyboard 105, display unit 106, disk storage unit 109, and formatted storage drive unit 107. Generally, in contemporary systems, the formatted storage drive unit 107 is a tape drive (as shown) capable of reading from and recording to tape 108, which typically contains programs 110 and data. Computer program products containing mechanisms to effectuate the apparatus and methods in accordance with the present invention may reside in the memory section 104, on the disk storage unit 109, or on the tape 108 of such a system. Alternatively, formatted storage drive unit 107 may be replaced or supplemented by a floppy drive unit, a CD-ROM drive unit, or other formatted storage medium drive unit. Disk storage unit 109 is preferably coupled to processor 101 by source storage controller 111, and formatted storage drive unit 107 is preferably coupled to processor 101 by formatting storage controller 112, which may alternately be integral to formatted storage drive unit 107. Examples of such systems include VAX and ALPHA systems and personal computers offered by Compaq Computer Corporation, personal computers offered by other manufacturers, and other systems running VMS, Windows NT, a UNIX-based operating system or another typical operating system. In accordance with the present invention, host system software modules may be executed by CPU 103, and command block, data definition, and on-media structure definition, as well as source and destination data, may be stored on disk storage unit 109 or other storage medium units coupled to the system. It should be understood that the illustrated data structures of FIGS. 3, 4, 5, and 6 are labeled as 32-bit data structures as examples only. Other field sizes are also contemplated in accordance with the present invention.

Figure 2:
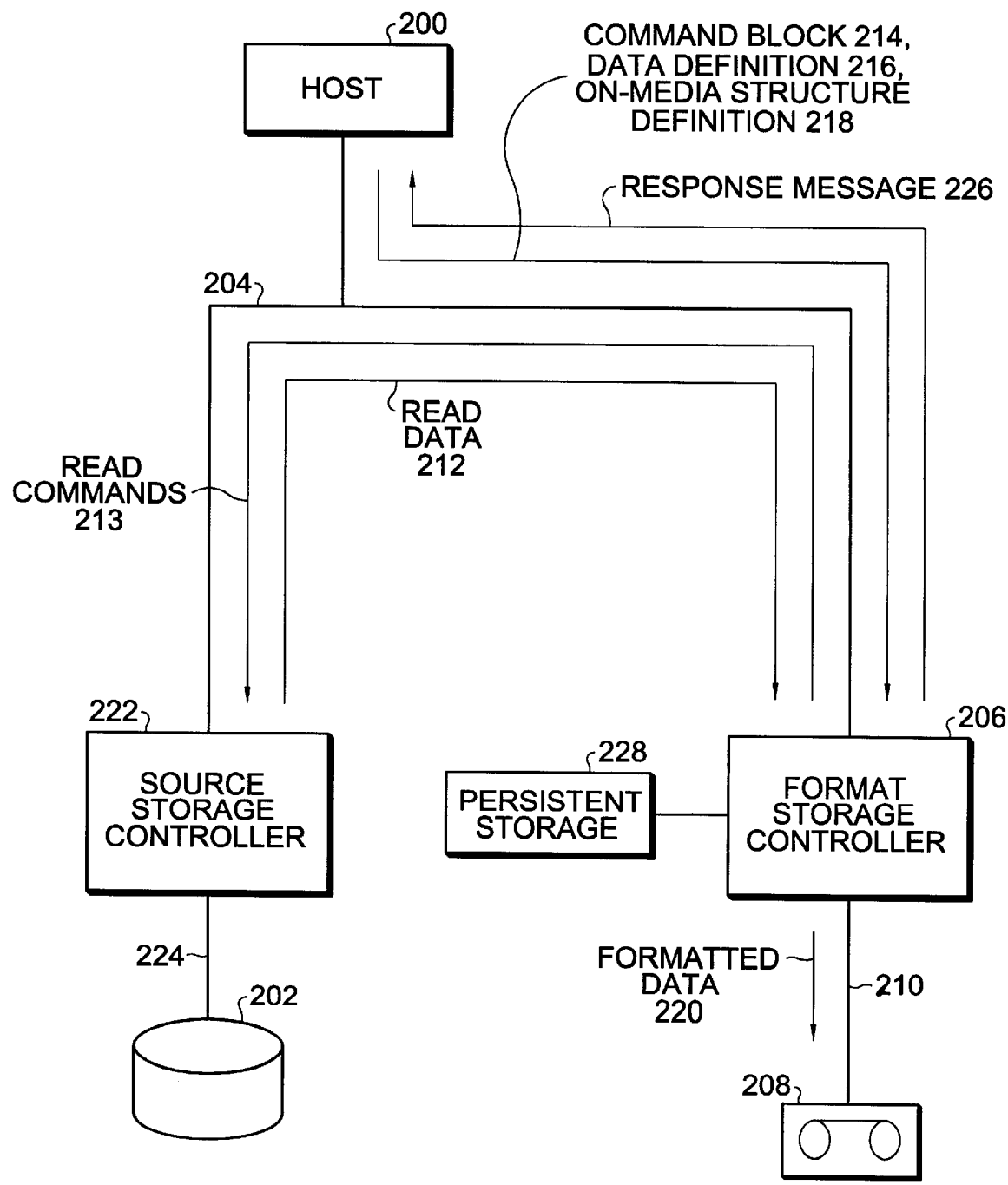
FIG. 2 depicts an exemplary system embodiment in accordance with the present invention.

FIG. 2 depicts an exemplary system embodiment in accordance with the present invention. The host system 200 is preferably coupled to the source storage controller 222 and the formatting storage controller 206 by the internal data bus 204. It should be understood that the host system 200, the source storage controller 222, and the formatting storage controller 206 may also be linked by a computer network, a peripheral cable, or another conventional data coupling. Furthermore, multiple host systems may be supported to initiate a formatted transfer operation. Likewise, multiple source storage controllers, formatted storage controllers and storage media may be operated simultaneously in accordance with the present invention.

Preferably, host system 200 provides instructions (e.g., data identifying the source storage medium) to allow the formatting storage controller 206 to configure a logical connection between itself and the source storage controller 222 to allow the two controllers to communicate and transfer data without continuous interaction by the host. In the exemplary embodiment shown in FIG. 2, the source storage controller 222 is preferably coupled to a source storage medium, e.g., the magnetic hard disk 202, by link 224, and the formatting storage controller 206 is preferably coupled to a formatted storage medium, i.e., magnetic tape 208, by link 210. In alternate embodiments, a source storage medium may include without limitation optical storage disks, reel or cartridge magnetic tapes, and other conventional storage media, formatted or unformatted. Likewise, the formatted storage medium may include without limitation reel or cartridge magnetic tapes, magnetic or optical disks, or any other conventional high-level or low-level formatted storage media.

Figure 3:
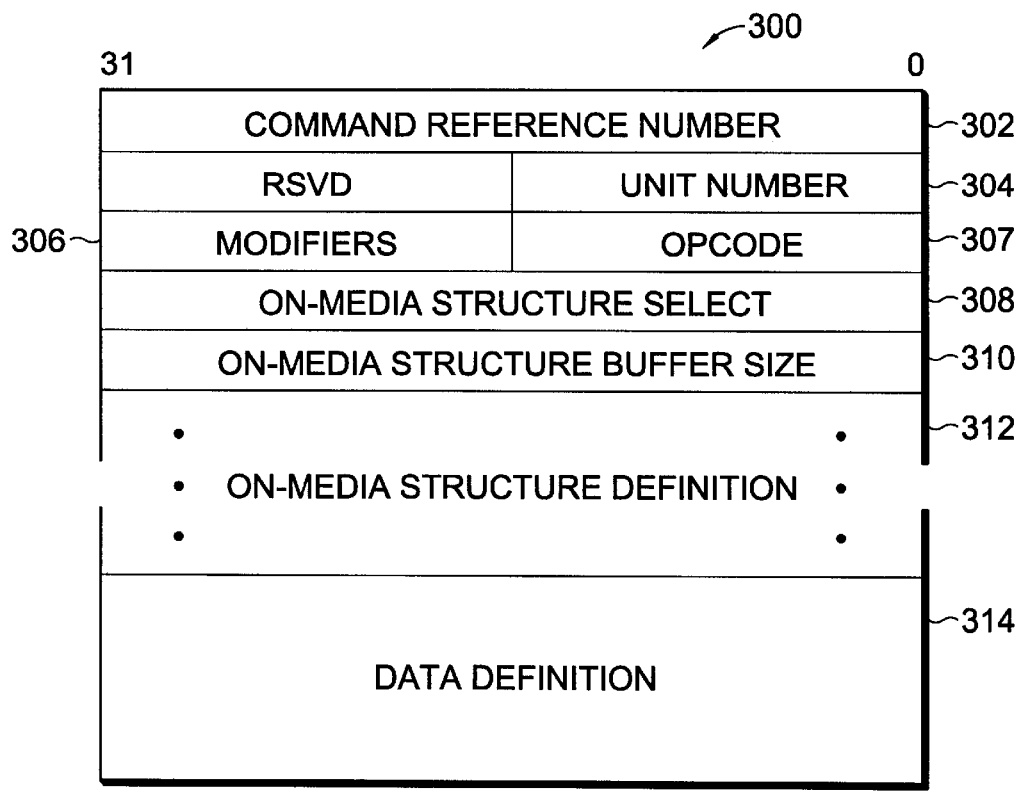
FIG. 3 depicts an exemplary embodiment of a command block in accordance with the present invention.
Figure 4:
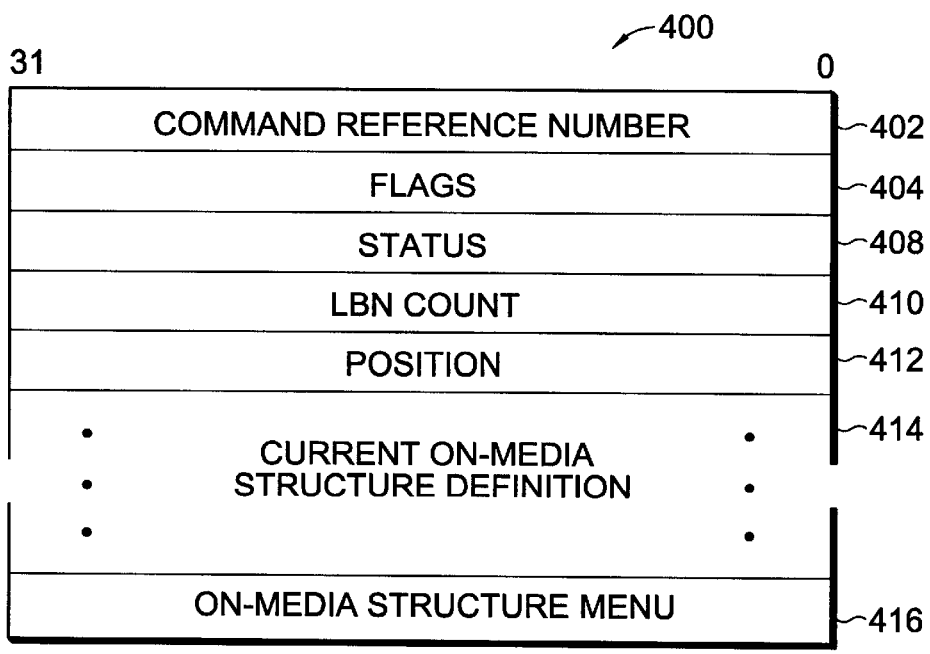
FIG. 4 depicts an exemplary embodiment of a response message block in accordance with the present invention.

In the illustrated embodiment, the host system 200 sends command block 214, data definition 216, and on-media structure definition 218 to formatting storage controller 206. The command block 214 (as shown in FIG. 3) preferably includes an on-media structure select field. The host system 200 sends the command block 214 to the formatting storage controller 206 to initialize the formatted storage medium 208 and to initiate the transfer of data from the source storage medium 202. At the completion of data transfers or upon the occurrence of an exception, the formatting storage controller 206 preferably signals the host system 200 using response message signal 226 (as shown in FIG. 4).

Figure 5:
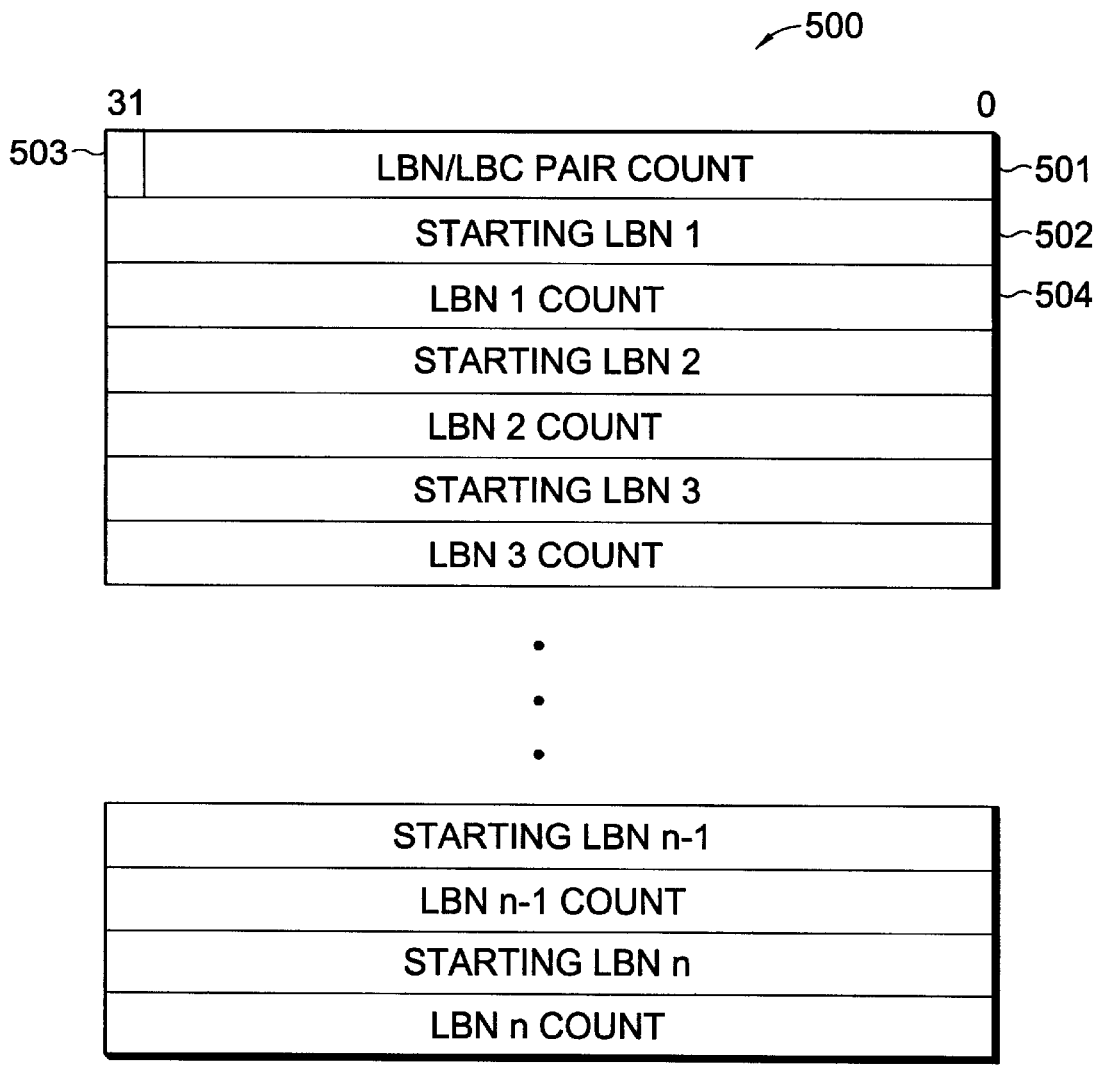
FIG. 5 depicts an exemplary embodiment of a data definition in accordance with the present invention.

The data definition 216 (as shown in FIG. 5) preferably includes a list of one or more transfer definitions and a transfer flag. Generally, in the backup process, the data definition 216 identifies the source disk 202 and describes the location of data to be read from disk 202. Alternately, the data definition 216 can identify multiple source storage media, including source disk 202, from which data can be read for storage on a formatted storage media. By receiving and processing the data definition 216, the controller 206 can locate and read the defined read data 212 from disk 202 across bus 204. Preferably, the formatting storage controller 206 sends read commands 213, specifying data indicated in the data definition 216, to the source storage controller 222 to access the data stored on the source storage medium 202.

Generally, in a recovery process, the data definition 216 would be a single transfer definition including the source unit identifier and the amount of space required in the destination storage medium. A more complex data definition can also used to write data to multiple storage blocks or multiple storage mediums, in accordance with the present invention. As such, the data definition may be structured and used in a similar fashion in both read and record modes.

Figure 6:
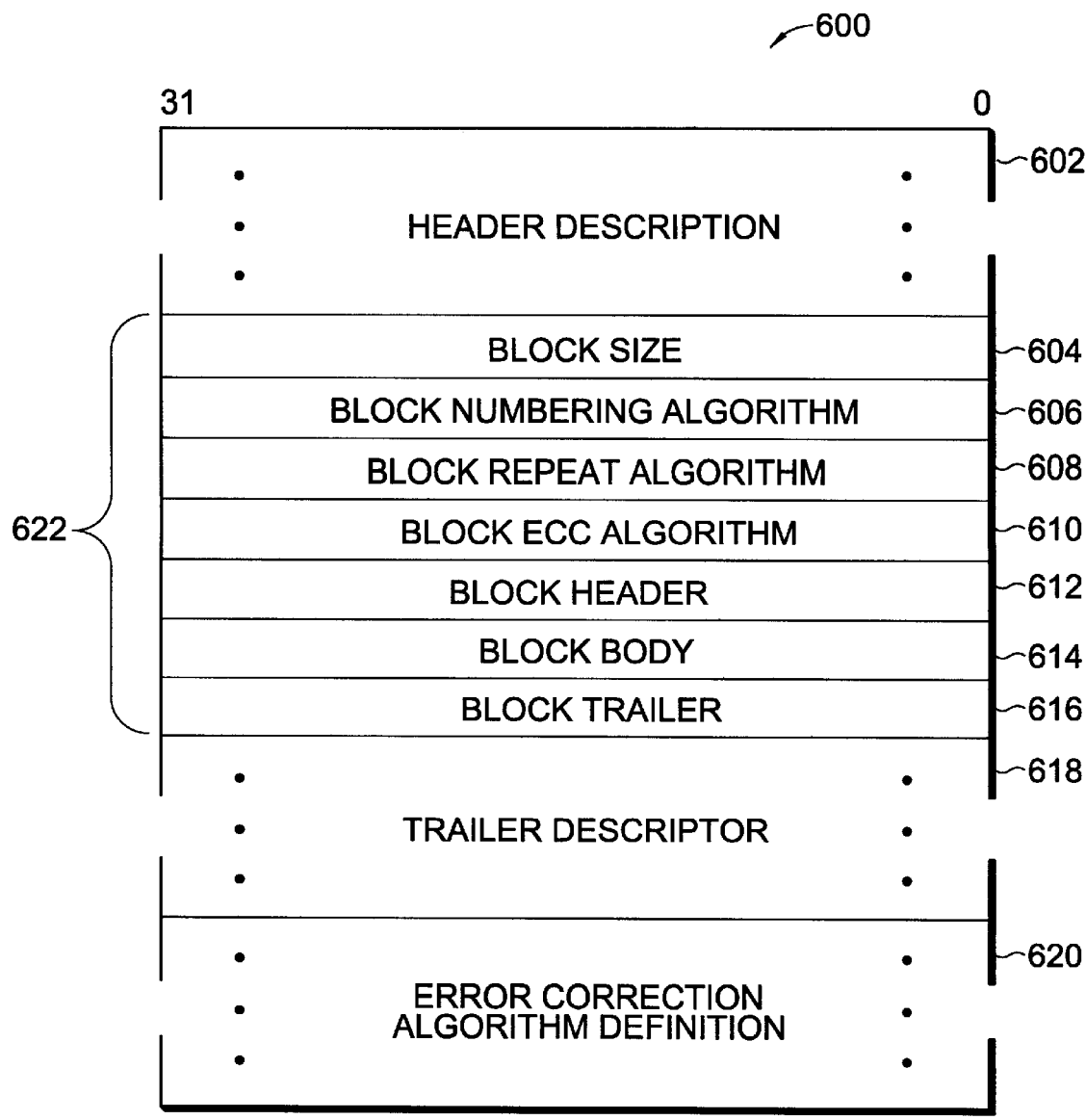
FIG. 6 depicts an exemplary embodiment of an on-media structure definition in accordance with the present invention.

The on-media structure definition 218 (as shown in FIG. 6) preferably includes, among other fields, a header descriptor, a trailer descriptor, a Block size, a Block Structure, and an Error Correction Code (ECC) algorithm specification. Generally, the on-media structure definition 218 describes the format in which read data 212 is to be recorded onto tape 208. The data resulting from the formatting operation of formatting storage controller 206 is illustrated as formatted data 220. Host system 200 initiates the transfer process by sending command block 214 to the formatting storage controller 206, which parses the command block 214 and performs the archival operation as directed therein.

The persistent storage unit 228 is preferably coupled to the formatting storage controller 206 to store one or more on-media structure definitions, which may be referenced through an on-media structure select field in the command block 214. The on-media structure select instructs the formatting storage controller 206 which on-media structure definition to use from the persistent storage unit 228. In this embodiment, the formatting storage controller 206 may select by reference a number of on-media structure definitions that are stored in the persistent storage unit 228. To indicate which supported on-media structure definition to apply during a transfer operation, a host system stores an on-media structure selector in the on-media structure select field of the command block 214. The formatting storage controller 206 receives the command block 214, reads the on-media structure selector, and selects the corresponding on-media structure definition from the persistent storage unit 228 for use during data transfer, thereby alleviating the requirement that the host provide a detailed on-media structure definition in the command block 214. Preferably, the formatting storage controller 206 supports access by the host system 200 to record one or more on-media structure definitions in persistent storage unit 228 via command block 214. The persistent storage unit 228 preferably includes a non-volatile memory but may alternately include without limitation a magnetic or optical disk or other persistent media.

In a representative "verify copy" operation which may be additionally performed in accordance with the system and method of the present invention, a read operation may be performed on both a source storage unit (e.g. source disk 202) and a formatted storage unit (e.g. magnetic tape 208) with the formatting storage controller 206 performing a comparison operation on the resultant data. Further, a "formatted read" operation may be performed wherein data is read from a formatted storage unit (e.g. magnetic tape 208) by the formatting storage controller 206 and then written to a destination (or source) storage unit (e.g. source disk 202).

FIG. 3 depicts an exemplary embodiment of a command block 300 in accordance with the present invention. The Command Reference Number field 302 stores a unique number identifying the specific command initiated by the command block. An example of a command is a TAPE COPY DATA command, but other commands may also be specified by the opcode field 307. In FIG. 3, "RSVD" represents a data field not specified or otherwise reserved for future use. The Unit Number field 304 stores an identifier specifying the device on the formatting storage controller 206 (of FIG. 2) that is to process the command. The Modifiers field 306 is capable of storing values that modify operation of the transfer process.

Examples of modifiers include "verify copy", which, as previously described, causes the formatting storage controller 206 (FIG. 2) to compare the formatted data recorded on the formatted storage medium with the data stored on an alternate storage medium (e.g. a source or destination storage medium) and "formatted read", which causes the formatting storage controller 206 (FIG. 2) to read the formatted data stored on the formatted storage medium and transfer it to a destination storage medium. Other exemplary modifiers may include "define on-media structure", which defines a new on-media structure (i.e., format) to be stored persistent storage unit of the formatting storage controller; "establish communication path", which sets up a logical connection for communication between the source and destination controllers for subsequent data transfers; and "retain communication path", which maintains the logical connection upon completion of the transfer specified in the current command. In an exemplary embodiment, modifiers can also be used to specify an error recovery policy (i.e., the response of the system to an exception detected during the transfer process).

The On-Media Structure Select field 308 preferably stores an on-media structure selector that identifies the on-media structure defined in persistent storage unit to be used when recording to the formatted storage medium. A value of zero indicates that the desired on-media structure is defined within the command block itself, instead of in the persistent storage unit. The On-media Structure Buffer Size field 310 stores a value defining the size of the On-media Structure Definition field 312, which defines the format in which data is to be recorded on the formatted storage medium. If the On-Media Structure Select field 308 contains a non-zero value, then preferably the On-media Structure Buffer Size field 310 contains a zero value, and the On-media Structure Buffer field 312 is absent.

The Data Definition block 314 stores the data definition of the data stored on the source storage medium that is specified to be recorded in the formatted storage medium. The data definition comprises a transfer definition comprising a word pair that defines the starting LBN (Logical Block Number) and LBC (Logical Block Count) for each requested data transfer. Preferably, each transfer definition also comprises a source unit identifier, typically in the LBN field or in a separate field of the transfer definition. In an exemplary embodiment of the present invention, the defined order of transfer definitions can be re-ordered to optimize the transfer, particularly when the first transfer definition for a source unit is unavailable, and a source unit in a subsequent transfer definition is available. Furthermore, a formatting storage controller can combine LBN/LBC pairs to optimize the data transfer (e.g., by combining multiple logical blocks in a single read or write command).

FIG. 4 depicts an exemplary embodiment of a response message block 400 in accordance with the present invention. The exemplary response message block 400 of FIG. 4 preferably comprises Command Reference Number field 402, which stores the number uniquely matching this specific response message to a corresponding command message; a Status field 408, which stores data defining the status of the responding command operation; a Flags field 404, which further qualifies the status; an LBN Count field 410, which stores the number of LBNs that were successfully transferred in the corresponding command operation; a Position field 412, which stores a value indicating the current physical position on the formatted storage medium (e.g., a tape mark indicating the current location on a magnetic tape); a Current Structure field 414, which stores an indicator of the OMS (or the OMS itself) that was used during the responding command operation; and an OMS Menu field 416 which stores, preferably in a bit mask representation, a list of OMSs that are supported by the responding formatting storage controller.

A typical data definition 500 is illustrated in more detail in FIG. 5, comprising an LBN/LBC Pair Count field 501, which stores the number of LBN/LBC pairs in the data definition block 500; at least one "source LBN" field 502, which preferably stores identifiers of the source storage medium and the starting LBN from which the read data is to be transferred; and at least one corresponding "LBC" field 504, which stores the number of blocks to be transferred between the source storage controller and the formatting storage controller, starting at the source LBN. In FIG. 5, n is a positive integer representing an index of each of the LBN/LBC pairs. As used herein, the term "LBN" is defined to also include the source storage unit address or system identifier of the source storage controller which allows the formatting storage controller to establish a logical connection for communication with the source storage controller.

In an embodiment of the present invention, the LBN/LBC Pair count also includes a transfer flag field 503. The transfer flag field 503 can indicate (preferably with a last transfer flag) whether the data defined in the data definition is the last transfer of the transfer process (which will cause the formatting storage controller to record a trailer to the formatted storage medium using the trailer descriptor of the on-media structure definition). Other means of representing the end of the transfer process, including a separate transfer flag field or an integrated transfer flag code built into the data definition, the command block, or the on-media structure definition, are also contemplated within the scope of the present invention.

FIG. 6 depicts an exemplary embodiment of an On-media Structure (OMS) Definition 600 in accordance with the present invention. A variety of OMS Definitions can be specified, including without limitation ANSI X3.27, VMS backup, UNIX tar, UNIX dump, HSC Backup and Guardian formats. An "unformatted" on-media structure is also supported to allow the data format or locations from the source storage medium to be substantially replicated on a destination or formatted storage medium. Such an "unformatted" on-media structure definition could include fields similar to those in a data defintion.

The exemplary OMS Definition 600 includes a header descriptor 602, a block structure 622, a trailer descriptor 618, and an error correction algorithm definition field 620. The header descriptor 602 includes a byte-by-byte layout of the header that is to be recorded at the beginning of each data session to the formatted storage medium. Generally, the block structure algorithms provide the definition of an on-media structure having variable fields (e.g., block numbers and ECCs). That is, the controller uses the algorithms to calculate subsequent values for repeated blocks.

The block structure 622 preferably includes a description of the optionally repeating and variable block structure to be recorded on the formatted storage medium. The illustrated block structure 622 includes: a Block Size field 604, which stores the record size of a block of data to be recorded to the formatted storage medium; a Block Numbering Algorithm field 606, which stores data describing an algorithm for numbering data blocks recorded to the formatted storage medium, if any; a Block Repeat Algorithm field 608, which stores data describing an algorithm for specifying data block repeat patterns, if any; a Block ECC Algorithm field 610, which stores data describing an algorithm for error correction coding of the data block, if any; a Block Header field 612, which stores a byte-by-byte layout of the header of the defined block that is to be recorded at the beginning of each data block on the formatted storage medium; a Block Body field 614, which stores data defining the size and layout of the data block when recorded on the formatted storage medium; and a Block Trailer field 616, which defines a byte-by-byte layout of the trailer that is to be recorded at the end of each data block on the formatted storage medium. The trailer descriptor 618 stores a byte-by-byte layout of the trailer that is written at the end of each data transfer session to the formatted storage medium. The error correction algorithm definition field 620 stores data describing an algorithm for error correction coding for the entire data transfer session, if any.

Figure 7:
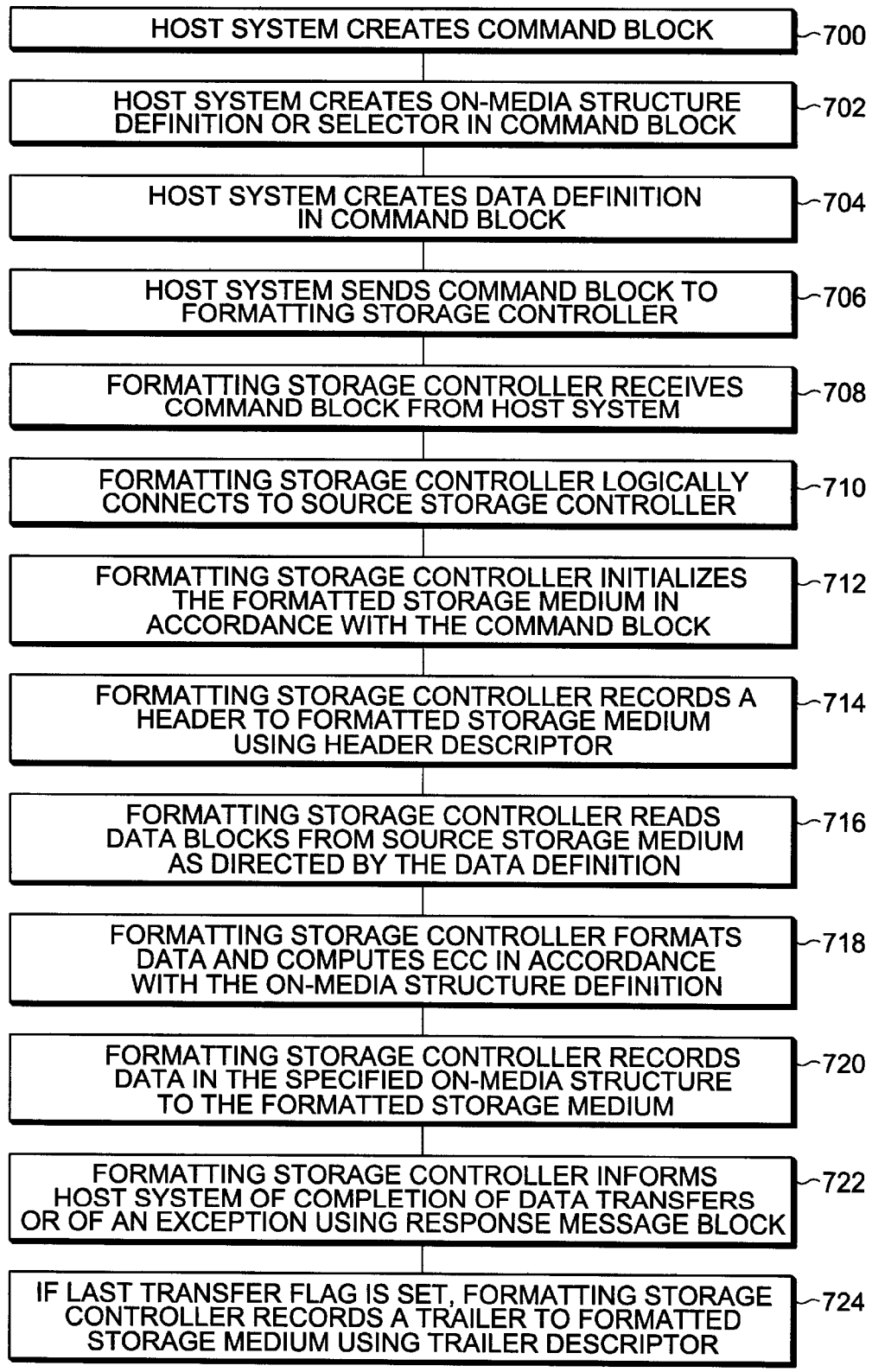
FIG. 7 depicts a flowchart of an exemplary method embodiment in accordance with the present invention.

FIG. 7 depicts a flowchart of an exemplary method in accordance with the present invention. In operations 700, 702, and 704, the host system creates a command block, an on-media structure (OMS) definition or selector, and a data definition, respectively. As illustrated, the OMS definition and the data definition are included in the command block. Alternately, an OMS definition in persistent storage can be selected using the on-media structure select field in the command block, in which case the OMS definition itself is absent from the command block. Other means of communicating the OMS definition and data definition to the formatting storage controller are also contemplated within the scope of the present invention. In operation 706, the host system sends a command block to the formatting storage controller to initiate the transfer process.

The formatting storage controller receives the command block from the host system in operation 708 and establishes a logical connection for communication between the two controllers, according to information in the command block, in operation 710. The formatting storage controller also initializes the formatted storage medium in accordance with the command block in operation 712. For example, the formatting storage controller may record ANSI standard tape labeling to a magnetic tape. In operation 714, the formatting storage controller writes a header to the formatting storage medium using the header descriptor included in the on-media structure definition. In operation 716, the formatting storage controller reads data blocks from the source storage medium as directed by the data definition. The formatting storage controller formats the read data and computes an error correction code in accordance with on-media structure definition in operation 718. In operation 720, the formatting storage controller records the data in the specified on-media structure to the formatted storage medium. When the transfer process is complete or an exception occurs, the formatting storage controller informs the host system using a response message block in operation 722. In operation 724, if the last transfer flag is set, the formatting storage controller records a trailer to the formatted storage medium using the trailer descriptor of the on-media structure definition.

Figure 8:
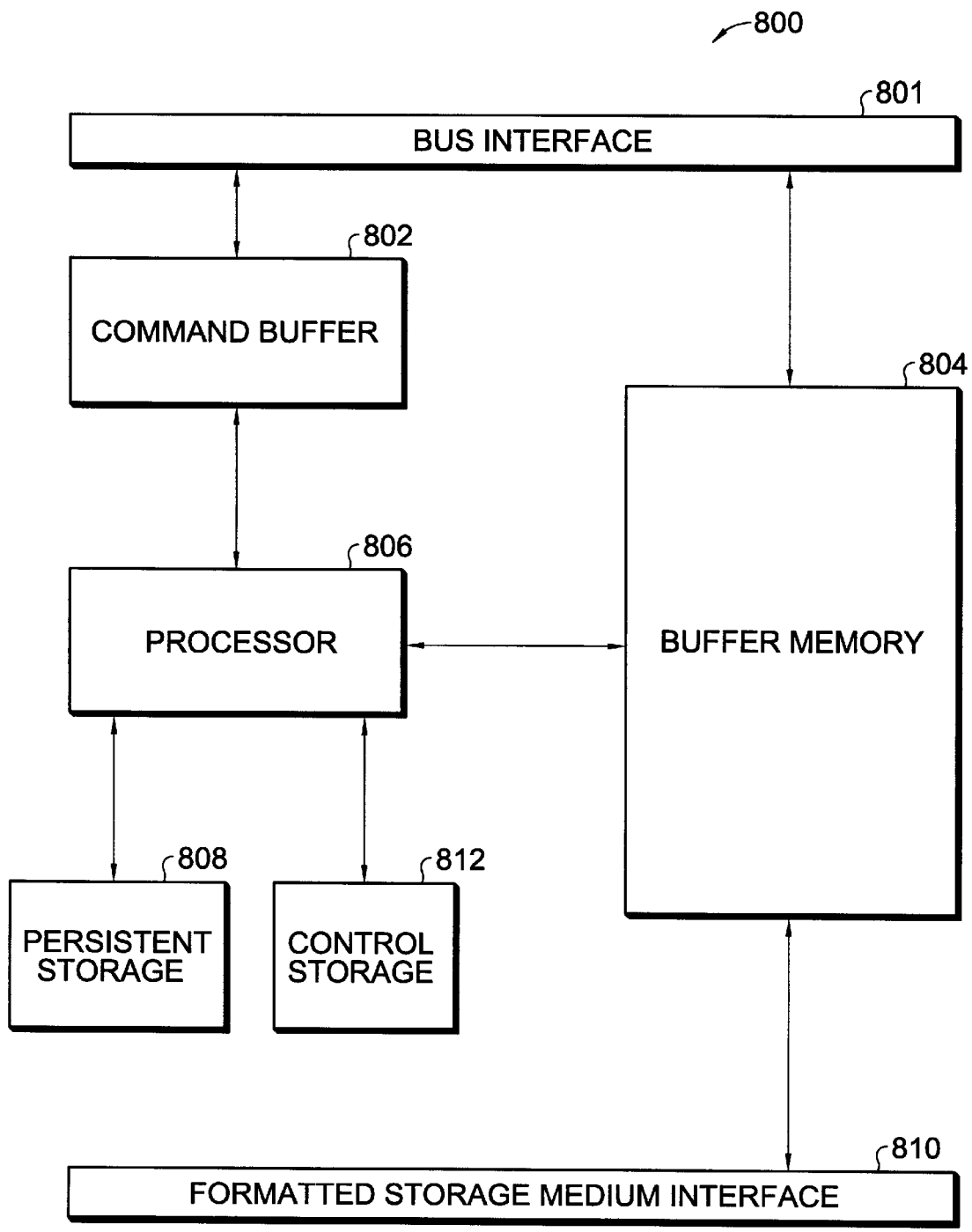
FIG. 8 depicts a block diagram of an exemplary embodiment of a formatting storage controller in accordance with the present invention.

FIG. 8 depicts a block diagram of an exemplary formatting storage controller 800 in accordance with the present invention. Preferably, the bus interface 801 is coupled to one or more host systems and one or more source storage controllers by a bus, as exemplified in FIG. 2. The bus interface 801 manages communications among the formatting storage controller 800, one or more host systems (see for example the host system 200 of FIG. 2) and/or a source storage controller (see for example the source storage controller 222 of FIG. 2). The command buffer 802 preferably receives a command block from a host system to initiate the data transfer operation. The processor 806 controls the data transfer operation by accessing the command block, establishing a logical connection with a source storage controller, reading the desired data (as indicated in the data definition) from the source storage controller without continuous interaction with the host system, and formatting the read data to record it on the formatted storage medium. The processor 806 may be a microprocessor, a script processor, or any other type of processor capable of controlling the data transfer operation.

Buffer memory 804 is preferably a random-access memory device for receiving data from a source storage medium through the bus interface 801. The processor 806 is capable of controlling the data in the buffer memory 804, preferably formatting it for recording to a formatted storage medium through the formatted storage medium interface 810. The processor 806 preferably includes or is coupled to a control storage 812 (such as non-volatile memory or instruction cache) for storing instructions that control the processor's operation in response to a received command block. The processor 806 also preferably includes registers and other necessary circuitry to perform the instructions for controlling the transfer process. The persistent memory unit 808 is configured to store one or more on-media structure definitions on which the processor 806 bases the format in which data is recorded to a formatted storage medium. The desired on-media structure definition may be referenced by way of an indicator stored in the command block, although other reference mechanisms, such as a persistent indicator set by the host system, are also contemplated within the scope of the present invention.

The formatting storage controller 800 may be implemented in a chip set (for example, mounted on a system board, on an adapter card, or in a peripheral storage unit) or integrated into a single chip. Other known controller configurations are also contemplated within the scope of the present invention.

While the method and program instructions disclosed herein have been described and shown with reference to particular operations performed in a particular order, it will be understood that these operations may be combined, sub-divided, or re-ordered to form an equivalent method or program without departing from the teachings of the present invention. Accordingly, unless specifically indicated herein, the order and grouping of the ordering is not a limitation of the present invention.

Moreover, while there have been described herein the principles of the present invention in conjunction with specific system, method, and program implementations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Moreover, the system and method disclosed may be implemented in hardware or software in accordance with the present invention. The applicants hereby reserve the right to formulate new claims to such features and/or combinations of such features during the prosecution of the present application or of any further application derived thereof.

What is claimed is:

1. A method for recording data on a formatted storage medium, said data being initially recorded on a source storage medium coupled to a source storage controller, said method comprising:

providing a formatting storage controller coupled to said formatted storage medium;

receiving an on-media structure definition and a data definition in said formatting storage controller;

reading said data from said source storage medium to said formatting storage controller in accordance with said received data definition;

recording said data on said formatted storage medium in accordance with said received on-media structure definition; and receiving a command block in said formatting storage controller including an on-media structure selector for selecting said on-media structure definition from a persistent storage.

2. The method of claim 1 wherein the operation of reading said data from said source storage controller comprises:

providing a host system coupled to said formatting storage controller and said source storage controller;

establishing a logical connection between said formatting storage controller and said source storage controller that bypasses said host system; and reading said data from said source storage medium through said logical connection to said formatting storage controller in accordance with said received data definition.

3. The method of claim 1 wherein said formatted storage medium is remote from said host system.

4. The method of claim 1 wherein said source storage medium is remote from said host system.

5. The method of claim 1 wherein the reading and recording operations are performed by said formatting storage controller.

6. The method of claim 1 further comprising:

receiving a command block in said formatting storage controller; and initializing said formatted storage medium in accordance with said received command block.

7. The method of claim 1 wherein the operation of receiving an on-media structure definition includes receiving at least one of a header descriptor, a trailer descriptor, a data block size, a data block structure, and an error correction code algorithm.

8. The method of claim 7 further comprising recording said received header descriptor to said formatted storage medium.

9. The method of claim 7 further comprising computing an error correction code in accordance with said error correction code algorithm specification.

10. The method of claim 7 further comprising recording said received trailer descriptor to said formatted storage medium.

11. The method of claim 1 wherein said operation of receiving a data definition includes receiving a list of at least one transfer definition including a logical block number and a logical block count.

12. The method of claim 11 wherein said formatting storage controller notifies said host system when all data transfers defined in said list of at least one transfer definition are completed.

13. The method of claim 11 wherein said formatting storage controller notifies said host system if an exception occurs during a data transfer defined in said list of at least one transfer definition.

14. A method for recording data on a formatted storage medium, said data being initially recorded on a source storage medium coupled to a source storage controller, said method comprising:

providing a formatting storage controller coupled to said formatted storage medium;

receiving an on-media structure definition and a data definition in said formatting storage controller;

reading said data from said source storage medium to said formatting storage controller in accordance with said received data definition; and recording said data on said formatted storage medium in accordance with said received on-media structure definition; and wherein the operation of receiving an on-media structure definition in said formatting storage controller comprises:

storing said on-media structure definition in a persistent storage unit accessible by said formatting storage controller;

receiving an on-media structure selector to select said on-media structure definition in said persistent storage unit; and reading said selected on-media structure definition from said persistent storage unit in accordance with said on-media structure selector.

15. The method of claim 14 wherein the operation of storing an on-media structure definition in said formatting storage controller comprises storing said on-media structure definition in a list of on-media storage definitions in said persistent storage unit.

16. A method for reading data recorded on a formatted storage medium to a destination storage medium, said method comprising:

providing a formatting storage controller coupled to said formatted storage medium;

receiving an on-media structure definition and a data definition in said formatting storage controller; and reading said data from said formatted storage medium to said formatting storage controller in accordance with said received on-media structure definition;

wherein the operation of receiving an on-media structure definition in said formatting storage controller comprises:

storing said on-media structure definition in a persistent storage unit accessible by said formatting storage controller;

receiving an on-media structure selector to select said on-media structure definition in said persistent storage unit; and reading said selected on-media structure definition from said persistent storage unit in accordance with said on-media structure selector.

17. The method of claim 16 further comprising sending said data from said formatting storage controller to said destination storage medium in accordance with said received data definition.

18. The method of claim 16 further comprising comparing said read data to data read from an alternate storage medium.

19. The method of claim 16 wherein the operation of reading said data from said formatted storage medium comprises:

providing a host system coupled to said formatting storage controller and said destination storage controller;

establishing a logical connection between said formatting storage controller and said destination storage controller that bypasses said host system; and sending said data from said formatted storage medium through said logical connection to said destination storage controller in accordance with said received data definition.

20. A system for recording data on a formatted storage medium, said data being initially recorded on a source storage medium coupled to a source storage controller, said system comprising:

a formatting storage controller coupled to said formatted storage medium and said source storage medium, a data definition received by said formatting storage controller and identifying said data in said source storage medium to be read by said formatting storage controller;

an on-media structure definition received by said formatting storage controller and defining a format in which said data is to be recorded to said formatted storage medium;

a persistent storage unit for storing said on-media structure definition; and an on-media structure selector for selecting said stored on-media structure definition, said on-media structure definition being readable from said persistent storage unit by said formatting storage controller in accordance with said on-media structure selector.

21. The system of claim 20 further comprising a host system for generating said data definition and said on-media structure definition and sending said definitions to said formatting storage controller.

22. The system of claim 20 further comprising:

a host system coupled to said formatting storage controller and said source storage controller; and a logical connection established by said formatting storage controller between said formatting storage controller and said source storage controller and bypassing said host system, said formatting storage controller configured to read said data from said source storage medium through said logical connection in accordance with said data definition.

23. The system of claim 22 wherein said logical connection includes a communication path between said controllers coupled by an internal data bus.

24. The system of claim 22 wherein said logical connection includes a communication path between said controllers coupled by a computer network.

25. A system for recording data on a formatted storage medium, said data being initially recorded on a source storage medium coupled to a source storage controller, said system comprising:

a formatting storage controller coupled to said formatted storage medium and said source storage medium;

a data definition received by said formatting storage controller and identifying said data in said source storage medium to be read by said formatting storage controller; and an on-media structure definition received by said formatting storage controller and defining a format in which said data is to be recorded to said formatted storage medium;

wherein said on-media structure definition includes an algorithm for calculating a block number of a repeated block.

26. A system for recording data on a formatted storage medium, said data being initially recorded on a source storage medium coupled to a source storage controller, said system comprising:

a formatting storage controller coupled to said formatted storage medium and said source storage medium;

a data definition received by said formatting storage controller and identifying said data in said source storage medium to be read by said formatting storage controller; and an on-media structure definition received by said formatting storage controller and defining a format in which said data is to be recorded to said formatted storage medium;

wherein said on-media structure definition includes an algorithm for specifying block repeat patterns.

27. A system for recording data on a formatted storage medium, said data being initially recorded on a source storage medium coupled to a source storage controller, said system comprising:
- a formatting storage controller coupled to said formatted storage medium and said source storage medium;
- a data definition received by said formatting storage controller and identifying said data in said source storage medium to be read by said formatting storage controller; and
- an on-media structure definition received by said formatting storage controller and defining a format in which said data is to be recorded to said formatted storage medium;
- wherein said on-media structure definition includes an algorithm for calculating the error correction coding of repeated blocks.

28. A system for reading data from a formatted storage medium, said system comprising:
- a formatting storage controller coupled to said formatted storage medium and a destination storage medium,
- a data definition received by said formatting storage controller for identifying a destination storage medium to which said data is sent by said formatting storage controller;
- an on-media structure definition received by said formatting storage controller and defining a format in which said data is to be read from said formatted storage medium by said formatting storage controller;
- a persistent storage unit for storing said on-media structure definition; and
- an on-media structure selector for selecting said stored on-media structure definition, said on-media structure definition being readable from said persistent storage unit by said formatting storage controller in accordance with said on-media structure selector.

29. The system of claim 28 wherein said formatting storage controller is further operative for comparing said data read from said formatted storage medium with data read from an alternate storage medium.

30. A computer system comprising:
- a formatted storage medium;
- a source storage medium coupled to said formatted storage medium and initially storing data;
- a formatting storage controller coupled to said formatted storage medium and said source storage medium for recording said data on said formatted storage medium;
- a data definition received by said formatting storage controller and identifying said data in said source storage medium to be read by said formatting storage controller; and
- an on-media structure definition received by said formatting storage controller and defining a format in which said data is to be recorded to said formatted storage medium, wherein said on-media structure definition includes an algorithm for calculating a block number of a repeated block.

31. A computer system comprising:
- a formatted storage medium;
- a source storage medium coupled to said formatted storage medium and initially storing data;
- a formatting storage controller coupled to said formatted storage medium and said source storage medium for recording said data on said formatted storage medium;
- a data definition received by said formatting storage controller and identifying said data in said source storage medium to be read by said formatting storage controller; and
- an on-media structure definition received by said formatting storage controller and defining a format in which said data is to be recorded to said formatted storage medium, wherein said on-media structure definition includes an algorithm for specifying block repeat patterns.

32. A computer system comprising:
- a formatted storage medium;
- a source storage medium coupled to said formatted storage medium and initially storing data;
- a formatting storage controller coupled to said formatted storage medium and said source storage medium for recording said data on said formatted storage medium;
- a data definition received by said formatting storage controller and identifying said data in said source storage medium to be read by said formatting storage controller; and
- an on-media structure definition received by said formatting storage controller and defining a format in which said data is to be recorded to said formatted storage medium, wherein said on-media structure definition includes an algorithm for calculating the error correction coding of repeated blocks.

33. A computer system comprising:
- a formatted storage medium;
- a source storage medium coupled to said formatted storage medium and initially storing data;
- a formatting storage controller coupled to said formatted storage medium and said source storage medium for recording said data on said formatted storage medium;
- a data definition received by said formatting storage controller and identifying said data in said source storage medium to be read by said formatting storage controller;
- an on-media structure definition received by said formatting storage controller and defining a format in which said data is to be recorded to said formatted storage medium, wherein said on-media structure definition is configured to be selected by a selector in a command block received by said formatting storage controller; and
- a persistent storage unit for storing said on-media structure definition.

34. A computer system comprising:
- a formatted storage medium;
- a destination storage medium coupled to said formatted storage medium;
- a formatting storage controller coupled to said formatted storage medium and said destination storage medium for reading data recorded on said formatted storage medium;
- a data definition received by said formatting storage controller and identifying said destination storage medium to which data is to be sent by said formatting storage controller; and
- an on-media structure definition received by said formatting storage controller and defining a format in which said data is to be read from said formatted storage medium, wherein said on-media structure definition is configured to be selected by a selector in a command block received by said formatting storage controller; and a persistent storage unit for storing said on-media structure definition.

35. The computer system of claim 34 wherein said formatting storage controller is further operative for comprising said data read from said formatted storage medium with data read from an alternate storage medium.

36. A formatting storage controller for recording data on a formatted storage medium, said data being initially recorded on a source storage medium coupled to a source storage controller, said formationg storage controller comprising:

a bus interface for coupling said formatting storage controller to said source storage controller;

a command buffer for receiving a command block from said bus interface, said command buffer causing said formatting storage controller to execute a data transfer from said source storage medium to said formatted storage medium;

a processor in said formatting storage controller for controlling said data transfer in accordance with said command block;

a formatted storage medium interface for coupling said formatting storage controller to said formatted storage medium; and a persistent storage unit for storing an on-media structure definition wherein said on-media structure definition is configured to be selected by a selector in a command block received by said formatting storage controller.

37. The formatting storage controller of claim 36 further comprising a buffer memory under control of said processor for receiving data from said source storage medium during said data transfer.

38. A formatting storage controller for reading data from a formatted storage medium, said controller comprising:

a bus interface for coupling said formatting storage controller to a source storage controller;

a command buffer for receiving a command block from said bus interface, said command buffer causing said formatting storage controller to execute a data transfer from said formatted storage medium to a destination storage medium controlled by said source storage controller;

a processor in said formatting storage controller for controlling said data transfer in accordance with said command block;

a formatted storage medium interface for coupling said formatting storage controller to said formatted storage medium; and a persistent storage unit for storing an on-media structure definition, wherein said on-media structure definition is configured to be selected by a selector in a command block received by said formatting storage controller.

* * * * *